US012103825B2

(12) United States Patent
Barnett

(10) Patent No.: US 12,103,825 B2
(45) Date of Patent: Oct. 1, 2024

(54) TRENCH ROLLER LIFTING ADAPTER

(71) Applicant: Ames Barnett, Washington, GA (US)

(72) Inventor: Ames Barnett, Washington, GA (US)

( * ) Notice: Subject to any disclaimer, the term of this patent is extended or adjusted under 35 U.S.C. 154(b) by 0 days.

(21) Appl. No.: 18/144,851

(22) Filed: May 9, 2023

(65) Prior Publication Data

US 2023/0278832 A1 Sep. 7, 2023

Related U.S. Application Data

(63) Continuation of application No. 17/316,344, filed on May 10, 2021, now Pat. No. 11,667,499, which is a continuation of application No. 16/450,994, filed on Jun. 24, 2019, now Pat. No. 11,001,480, which is a continuation of application No. 16/041,790, filed on Jul. 22, 2018, now Pat. No. 10,329,127, which is a continuation of application No. 14/950,045, filed on Nov. 24, 2015, now Pat. No. 10,029,891.

(51) Int. Cl.
*B66C 1/10* (2006.01)
*B66C 1/66* (2006.01)

(52) U.S. Cl.
CPC . *B66C 1/10* (2013.01); *B66C 1/66* (2013.01)

(58) Field of Classification Search
CPC .............. B66C 1/10; B66C 1/66; B66C 1/666
USPC ................... 294/82.1, 82.13, 82.18, 89, 215; 52/125.1, 125.2, 125.4, 125.5; 404/117
See application file for complete search history.

(56) References Cited

U.S. PATENT DOCUMENTS

| | | | | | |
|---|---|---|---|---|---|
| 2,842,822 | A * | 7/1958 | Bennett | A47G 25/08 | 248/339 |
| 3,206,243 | A * | 9/1965 | Miles | B66C 1/66 | 294/93 |
| 4,058,983 | A * | 11/1977 | Griswold | E02D 17/08 | 248/62 |
| 5,277,522 | A * | 1/1994 | Pertz | E02D 17/08 | 405/283 |
| 5,527,137 | A * | 6/1996 | Spencer | E02D 17/08 | 405/282 |
| 5,735,642 | A * | 4/1998 | Barringer | B66C 1/66 | 294/67.1 |
| 6,581,996 | B1 * | 6/2003 | Fromelius | B66C 1/666 | 52/704 |
| 6,662,681 | B2 * | 12/2003 | Crane | E02F 3/966 | 37/444 |

(Continued)

*Primary Examiner* — Paul T Chin
(74) *Attorney, Agent, or Firm* — WITHERS & KEYS, LLC

(57) ABSTRACT

A trench roller lifting adapter is for inserting/removing a trench roller into/from a trench absent intervention with the trench roller within the trench by a worker and saves time required for compacting dirt in the trench. The adapter has an upper portion configured for interaction with a hook attached to a cable dangling from a crane, excavator, tractor, or other type of construction equipment used to insert/remove the trench roller into/from a trench. The upper portion has a front portion and an opposed back portion with a pin and gap extending therebetween. Each of the front and back portions include respective guide members adapted for guiding the hook toward and into engagement with the pin. The adapter also has a lower portion depending from the upper portion that is configured for secure coupling to the trench roller to be moved into or out of the trench.

12 Claims, 7 Drawing Sheets

(56) References Cited

U.S. PATENT DOCUMENTS

| | | | | |
|---|---|---|---|---|
| 7,402,003 | B2 * | 7/2008 | Kundel, Sr. | E02D 17/086<br>405/282 |
| 2011/0265442 | A1 * | 11/2011 | Segura | B66C 1/66<br>59/86 |
| 2019/0352142 | A1 * | 11/2019 | Carter | B66C 1/66 |

* cited by examiner

TRENCH ROLLER LIFTING ADAPTER

FIELD OF THE INVENTION

The present invention relates, generally, to the field of construction equipment, including, but not limited to, trench rollers and apparatuses and methods for moving trench rollers into and out of trenches.

BACKGROUND OF THE INVENTION

Many construction projects require the installation of underground piping, conduit, cable, and other similar items. Typically, such installation involves the digging of a trench along a desired path using an excavator, trencher, tractor, or other construction equipment to remove dirt to form the trench and temporarily set aside the removed dirt. After the pipe, conduit, cable or other item is laid within the trench, the trench is backfilled with the removed dirt. However, to reduce adverse effects sometimes caused by the settling of the replaced dirt over time, the backfilling operation is often performed in series of sequentially repeated stages until the trench is entirely backfilled. Each stage includes the return of a portion of the previously removed dirt to the trench followed by compacting or packing of the returned dirt using a compactor or packer sometimes referred to as a "trench roller" that is designed and sized to compact or pack dirt within the trench.

In the past, construction workers had to get into the trenches in order to operate the trench rollers. Unfortunately, many construction workers were injured or killed as a result of trench cave-ins that occurred while the trench rollers were in use. To reduce the possibility of injury or death to construction workers due to trench cave-ins, today's trench rollers are remotely operated or controlled by construction workers via remote control devices such that construction workers no longer need to get into trenches to operate the trench rollers. However, trench rollers are, typically, repeatedly inserted into and removed from trenches during the stages of backfilling through the use of cables attached to the trench rollers at one end and to a crane or, frequently, the bucket of an excavator at the other end. To allow use of the trench rollers after insertion into trenches, construction workers must get into the trenches to detach the cables. And, to permit removal of the trench rollers from the trenches, construction workers must again get into the trenches to attach the cables. Because the construction workers are present within trenches during detachment and re-attachment of the cables, the construction workers are subjected to the possibility of trench cave-ins and to the corresponding possibility of injury or death resulting from such cave-ins.

Therefore, there is a need in the industry for apparatuses and methods that allow a trench roller to be inserted into, used, and removed from a trench absent intervention within the trench by a construction or other worker, and that solve these and other problems, deficiencies, and shortcomings of the present apparatuses and methods.

SUMMARY OF THE INVENTION

Broadly described, the present invention comprises an apparatus and methods for inserting a trench roller into a trench and for removing a trench roller from a trench, absent intervention within the trench by a construction or other worker. According to an example embodiment described herein, the apparatus comprises a trench roller lifting adapter having an upper portion configured for interaction with a hook attached to a cable (or other lifting implement) secured to and dangling from a crane, excavator, tractor, or other type of construction equipment used to insert a trench roller into a trench or to remove a trench roller from a trench. The upper portion has a front portion and an opposed back portion with a pin and a gap extending therebetween. Each of the front and back portions include respective guide members adapted for guiding a hook dangling from a crane toward and into engagement with the pin. The trench roller lifting adapter also has a lower portion depending from the upper portion that is configured for secure coupling to a trench roller to be moved into or out of a trench. During use in accordance with a method of the present invention, the trench roller lifting adapter is connected to a trench roller before insertion of the trench roller into a trench. Then, to insert the trench roller into a trench or to remove the trench roller out of the trench, a hook connected to an excavator, tractor or other construction equipment is lowered near the lifting adapter's pin and is guided into engagement with the pin by the guiding members. After the hook engages the pin and the hook is raised, the trench roller lifting adapter and, hence, the trench roller itself are also raised and the trench roller may be moved into or out of the trench by subsequent raising or lowering of the hook. Thus, movement of the trench roller into or out of the trench is accomplished without the necessity of a human entering the trench to couple the hook to the trench roller as has been done in the past.

Advantageously, the trench roller lifting adapter allows movement of a trench roller into or out of a trench absent a human having to enter the trench, thereby substantially eliminating the possibility of injury or death of a construction worker resulting from a cave-in during movement of the trench roller into or out of the trench. Also advantageously, because the trench roller lifting adapter eliminates the need to attach and detach cables to/from a trench roller in order to lift the trench roller into or out of a trench, a significant amount of time is saved when moving the trench roller and, hence, during compaction or packing of dirt within the trench.

Other uses, advantages and benefits of the present invention may become apparent upon reading and understanding the present specification when taken in conjunction with the appended drawings.

DETAILED DESCRIPTION OF THE DRAWINGS

Figure 1:
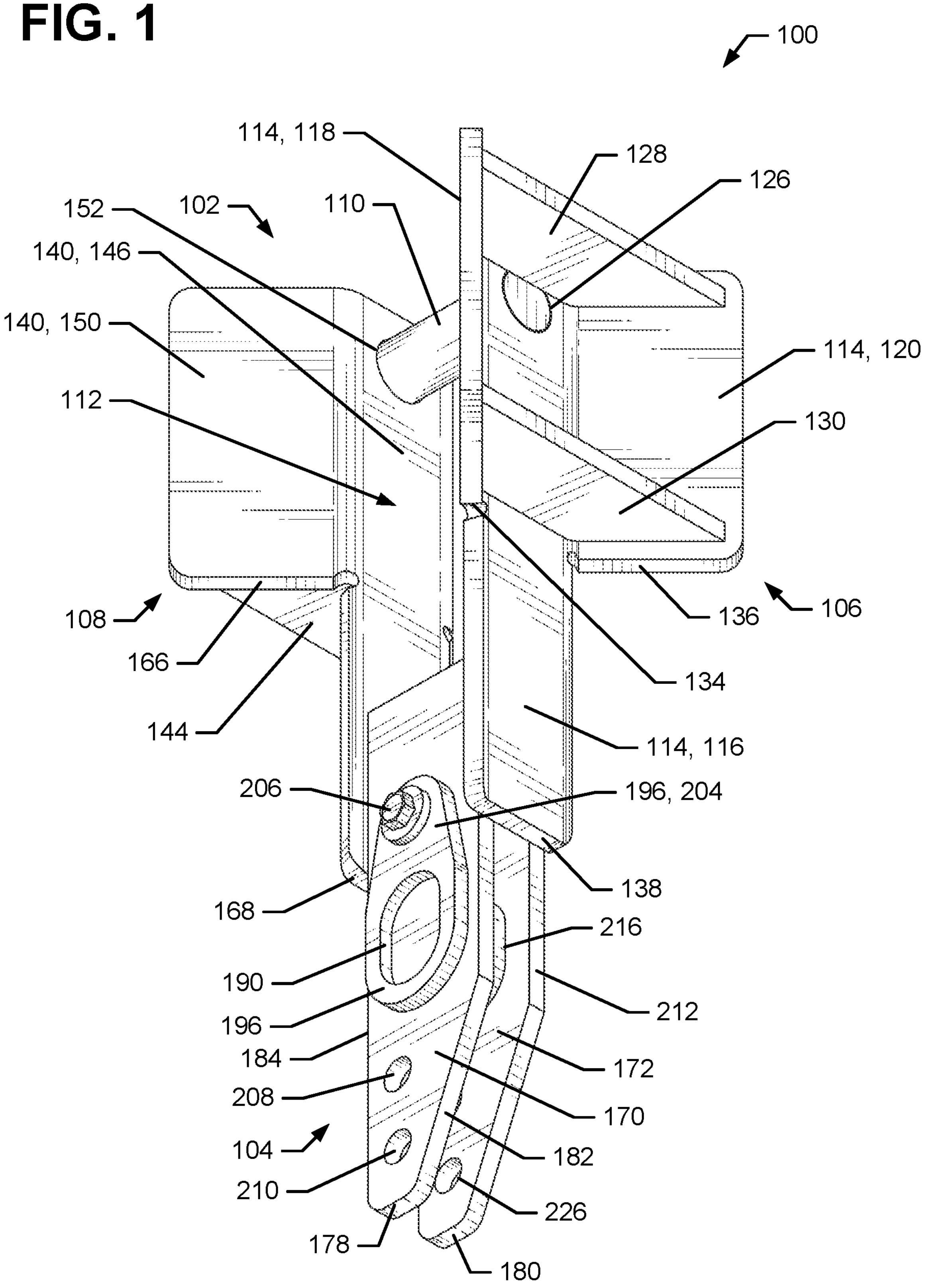
FIG. 1 displays a front, right side perspective view of a trench roller lifting adapter in accordance with an example embodiment of the present invention.
Figure 2:
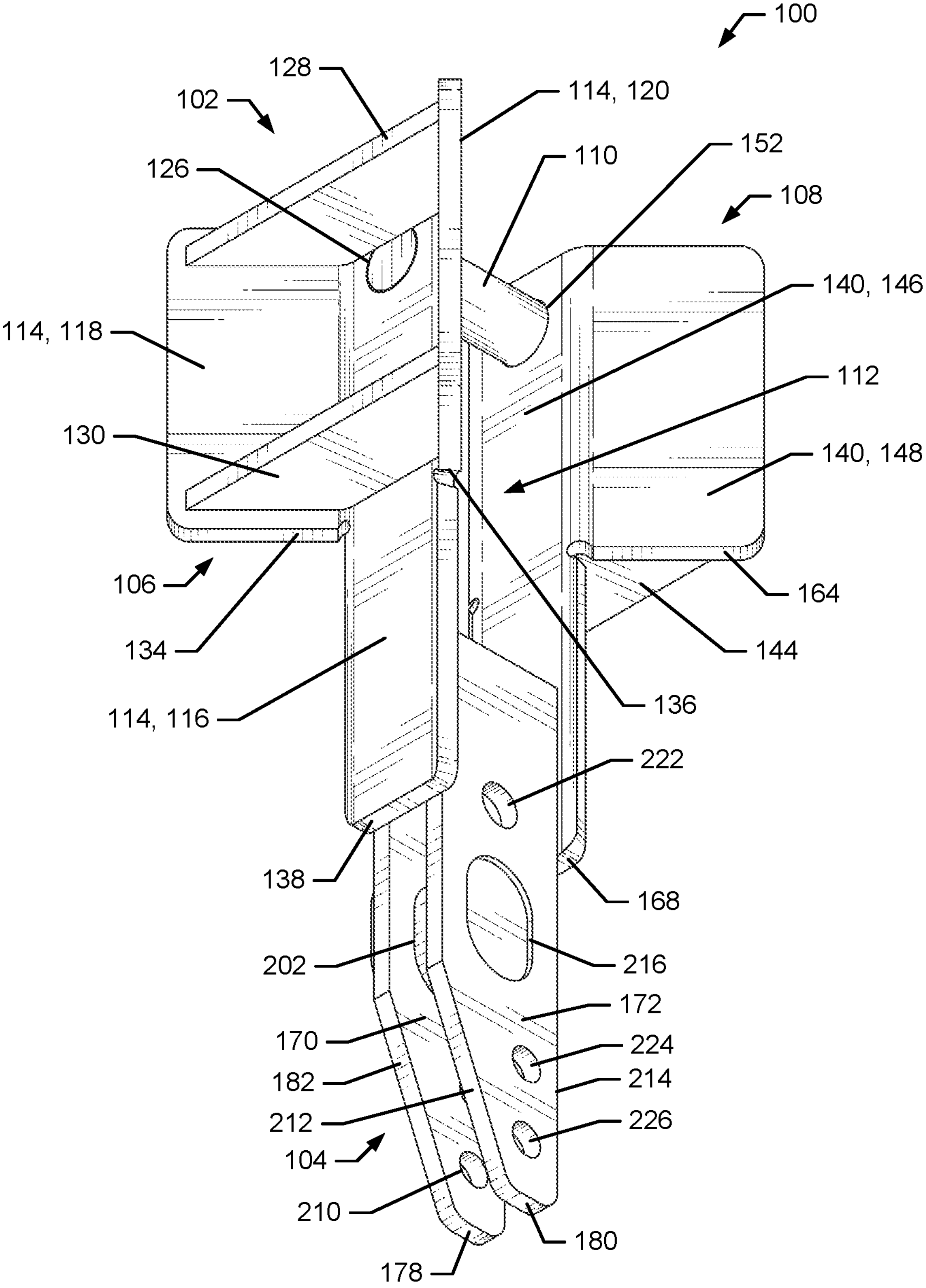
FIG. 2 displays a front, left side perspective view of the trench roller lifting adapter of FIG. 1.

Referring now to the drawings in which like numerals represent like elements or steps throughout the several views, FIGS. 1 and 2 display respective front right and front left side perspective views of a trench roller lifting adapter 100 in accordance with an example embodiment of the present invention. The trench roller lifting adapter 100 (also sometimes referred to herein as the "lifting adapter 100" or "adapter 100") comprises an upper portion 102 and a lower portion 104 secured to and depending from the upper portion 102. The upper portion 102 is configured for interaction with a hook attached to a cable secured to and dangling from a crane, excavator, tractor, or other type of construction equipment used to insert a trench roller into a trench or to remove a trench roller from a trench. The lower portion 104 is configured for secure coupling to a trench roller to be moved into or out of a trench. Such coupling may be permanent if, after the lifting adapter 100 is installed on a trench roller, there is no intention to move or use it with a different trench roller. Alternatively, such coupling may be non-permanent or temporary if the lifting adapter 100 is installed on a trench roller only for so long as needed to move the trench roller into and out of a trench, and is subsequently removed for use with another trench roller. It should be understood and appreciated that while the trench roller lifting adapter 100 is described herein as an individual component separable from and not a part of a trench roller, the lifting adapter 100 may be built into a trench roller as an integral and non-separable part thereof in another example embodiment. It should also be understood and appreciated that the trench roller lifting adapter 100 is further operable with a lifting implement other than a hook dangling from a crane, excavator, tractor, or other type of construction equipment to lift or lower a trench roller into or out of a trench.

The upper portion 102 of the trench roller lifting adapter 100 comprises a front portion 106, an opposed back portion 108, and a pin 110 extending therebetween. In accordance with the example embodiment, the front portion 106 and back portion 108 are substantially mirror images of one another. Together, the front portion 106 and back portion 108 define a gap 112 therebetween and are configured for receiving and guiding a hook (or other similar implement or device used to lift and move a trench roller) into engagement and interaction with the pin 110 absent human intervention such that the hook extends partially around and beneath the pin 110. When so positioned during lifting and movement of a trench roller via the lifting adapter 100, the hook exerts a force on the pin 110 sufficient to support the weight of the trench roller and to overcome the force of gravity as is necessary to lift and move the trench roller. According to the example embodiment, the pin 110 has a generally cylindrical shape and extends in a substantially horizontal direction between the lifting adapter's front and back portions 106, 108.

Figure 3:
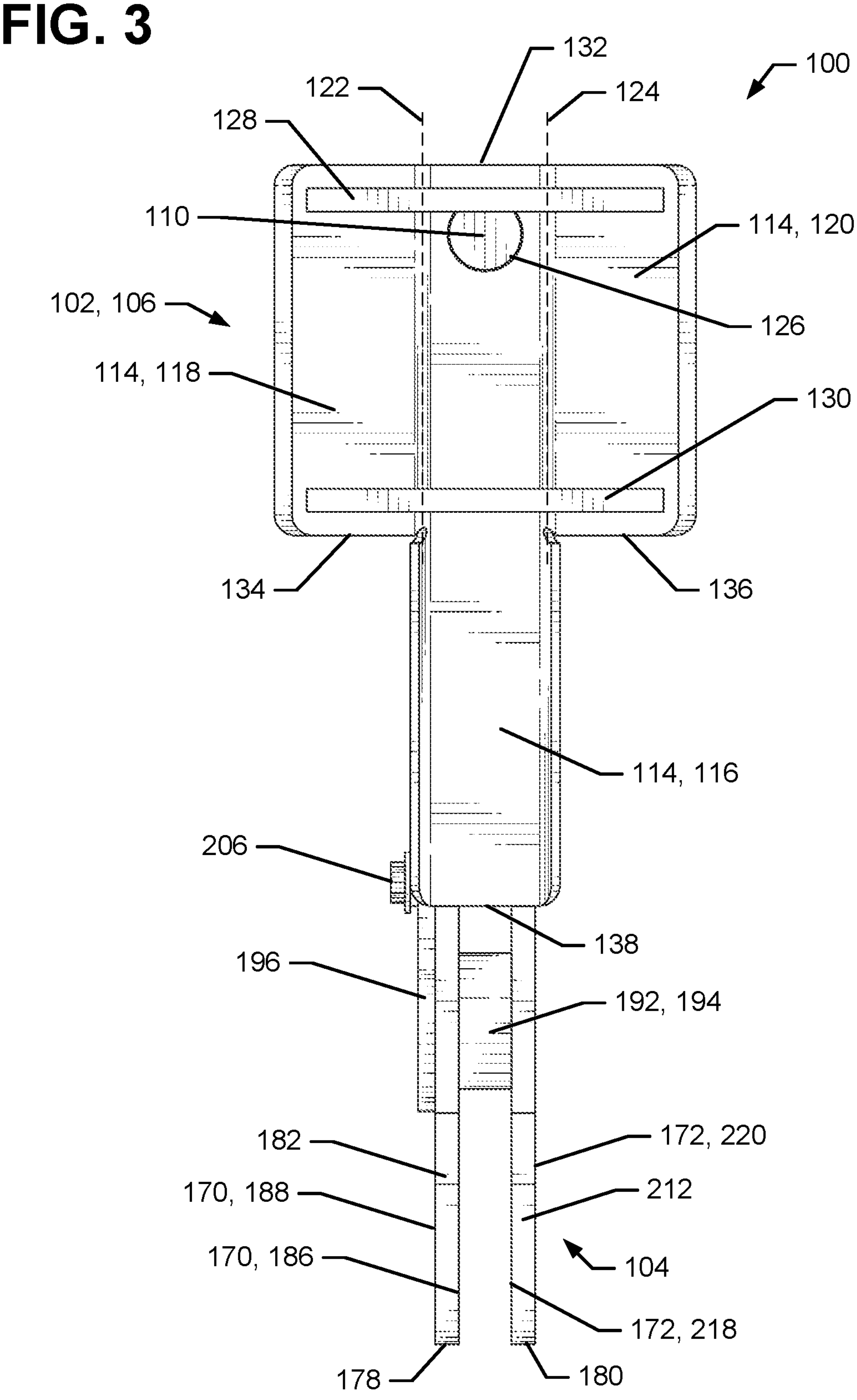
FIG. 3 displays a front elevation view of the trench roller lifting adapter of FIG. 1.

The trench roller lifting adapter's front portion 106 includes a guide member 114 having a generally rectangular first section 116 (as seen in the front elevation view of FIG. 3) extending predominantly in a substantially vertical direction and generally rectangular second and third sections 118, 120 extending from the first section 116 in directions away from the first section 116 and gap 112. More particularly, the second and third sections 118, 120 each define respective angles, $\alpha_1$ and $\alpha_2$, relative to the first section 116 (see FIGS. 7 and 8). According to the example embodiment, the angles, $\alpha_1$ and $\alpha_2$, each have an angular measure of forty-five degrees (45°), but it should be understood and appreciated that the angle, $\alpha_1$ and $\alpha_2$, may have a different angular measure in other example embodiments and that the second and third sections 118, 120 may form angles, $\alpha_1$ and $\alpha_2$, of different measures relative to the first section 116 in still other example embodiments. Also according to the example embodiment, the guide member 114 is formed from a substantially planar blank with the profiles of the first, second and third sections 116, 118, 120 being cut from the blank, followed by bending of the second and third sections 118, 120 relative to the first section 116 along longitudinally and vertically extending bend lines 122, 124 to form angles $\alpha_1$ and $\alpha_2$. The guide member's first section 116 defines a hole 126 near the top thereof that is adapted to receive a part of pin 110 therein. The pin 110 is fixedly secured within hole 126 such as by welding of the pin 110 to the guide member's first section 116 around hole 126, but may be secured by other methods that will not permit the pin 110 to move relative to the guide member 114.

The lifting adapter's front portion 106 also includes a pair of vertically opposed ribs 128, 130 fixedly secured between the guide member's first, second and third sections 116, 118, 120. The ribs 128, 130 limit flexing and rotation of the guide member's second and third sections 118, 120 about bend lines 122, 124 during use of the lifting adapter 100. Rib 128 is configured in a substantially horizontal plane near the top edge 132 of the guide member 114, while rib 130 is configured in a substantially horizontal plane near respective bottom edges 134, 136 of the guide member's second and third sections 118, 120. So configured and as illustrated in the front elevation view of FIG. 3, rib 130 is located approximately midway between the top and bottom edges 132, 138 of the guide member's first section 116 with a part of the guide member's first portion 116 extending in a generally downward vertical direction from the location at which rib 130 is secured to the first portion 116. According to the example embodiment, each rib 128, 130 comprises a generally planar member having a trapezoidal shape when viewed in top plan or bottom plan view (see FIGS. 7 and 8) and is secured to and between the guide member's first, second and third sections 116, 118, 120 by welding. It should be understood and appreciated that in other example embodiments, the ribs 128, 130 may have a different shape or be configured differently and may be secured to one or more of the guide member's first, second and third sections 116, 118, 120 by another method that substantially prevents movement of the second and third sections 118, 120 about bend lines 122, 124.

Figure 5:
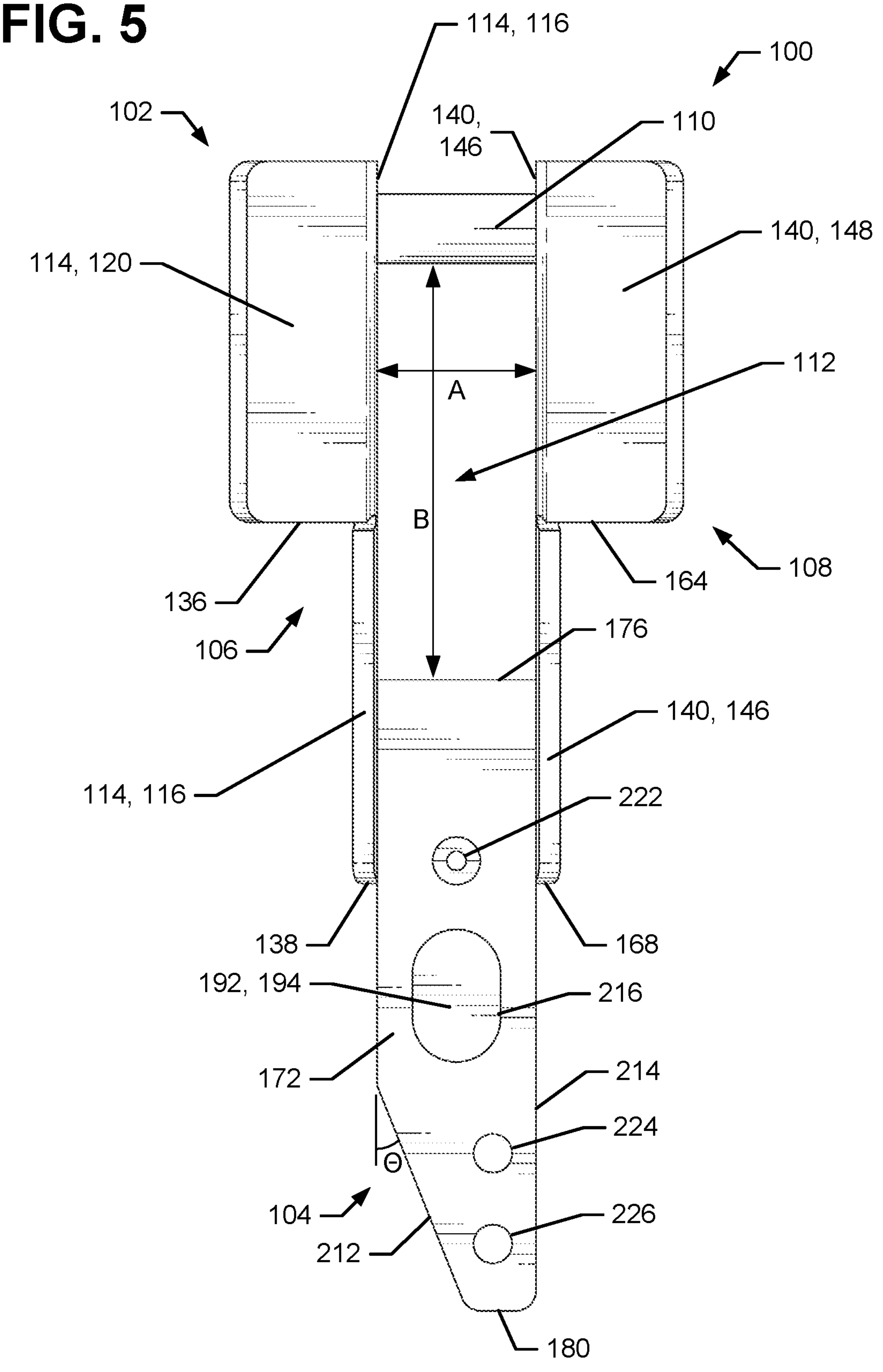
FIG. 5 displays a left side elevation view of the trench roller lifting adapter of FIG. 1.
Figure 6:
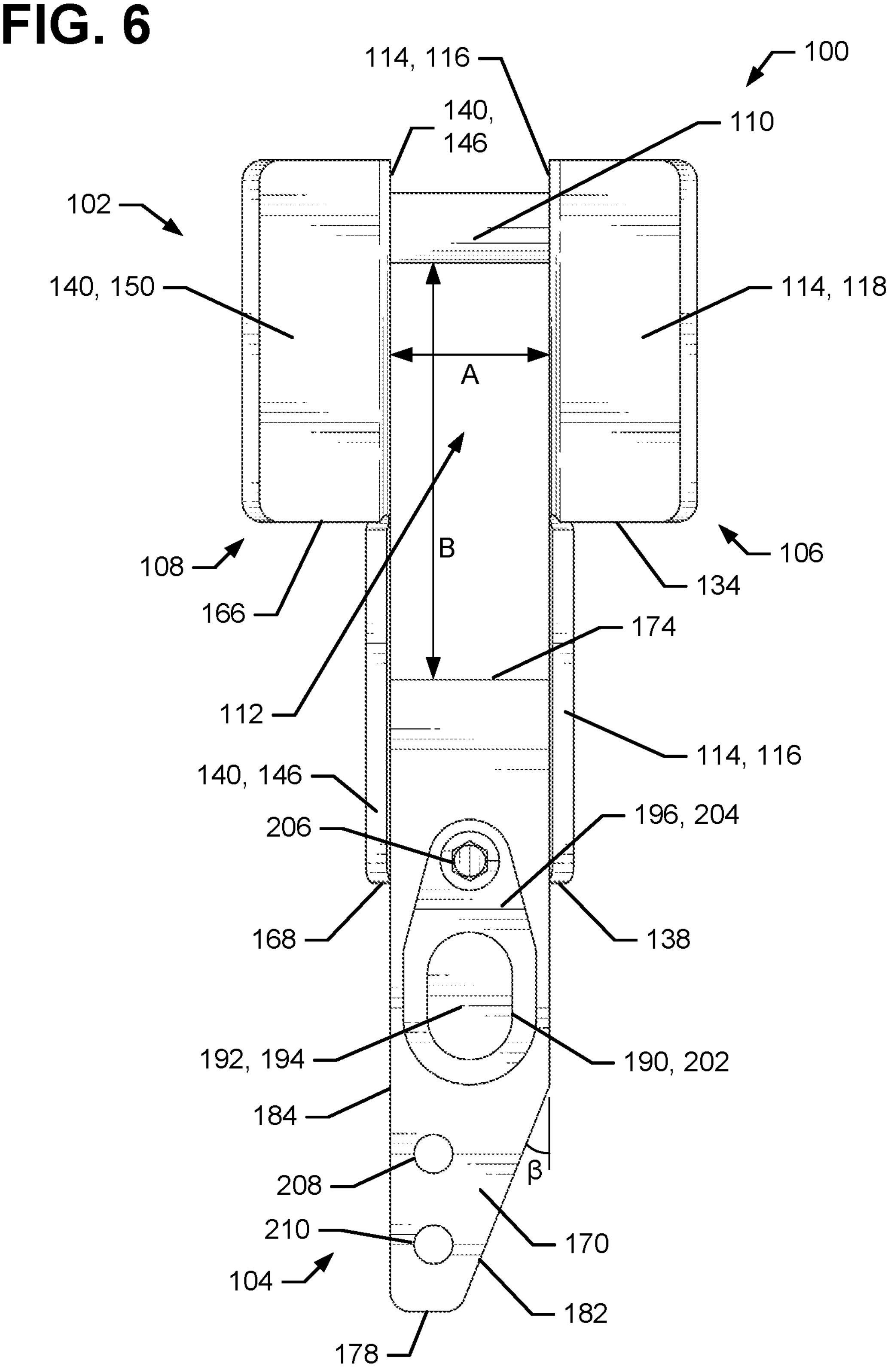
FIG. 6 displays a right side elevation view of the trench roller lifting adapter of FIG. 1.

As briefly described above, the trench roller lifting adapter 100 has a back portion 108 opposed to the front portion 106 defining gap 112 (seen most clearly in the left and right side elevation views of FIGS. 5 and 6) therebetween. The front portion 106 is positioned at a distance, A, relative to the back portion 108 such that gap 112 is configured and sized to easily receive a hook or other similar device between the front and back portions 106, 108 and to do so without requiring a human to guide the hook or device into the gap 112. The pin 110 extends through the gap 112 in a generally front-to-back horizontal direction.

Figure 4:
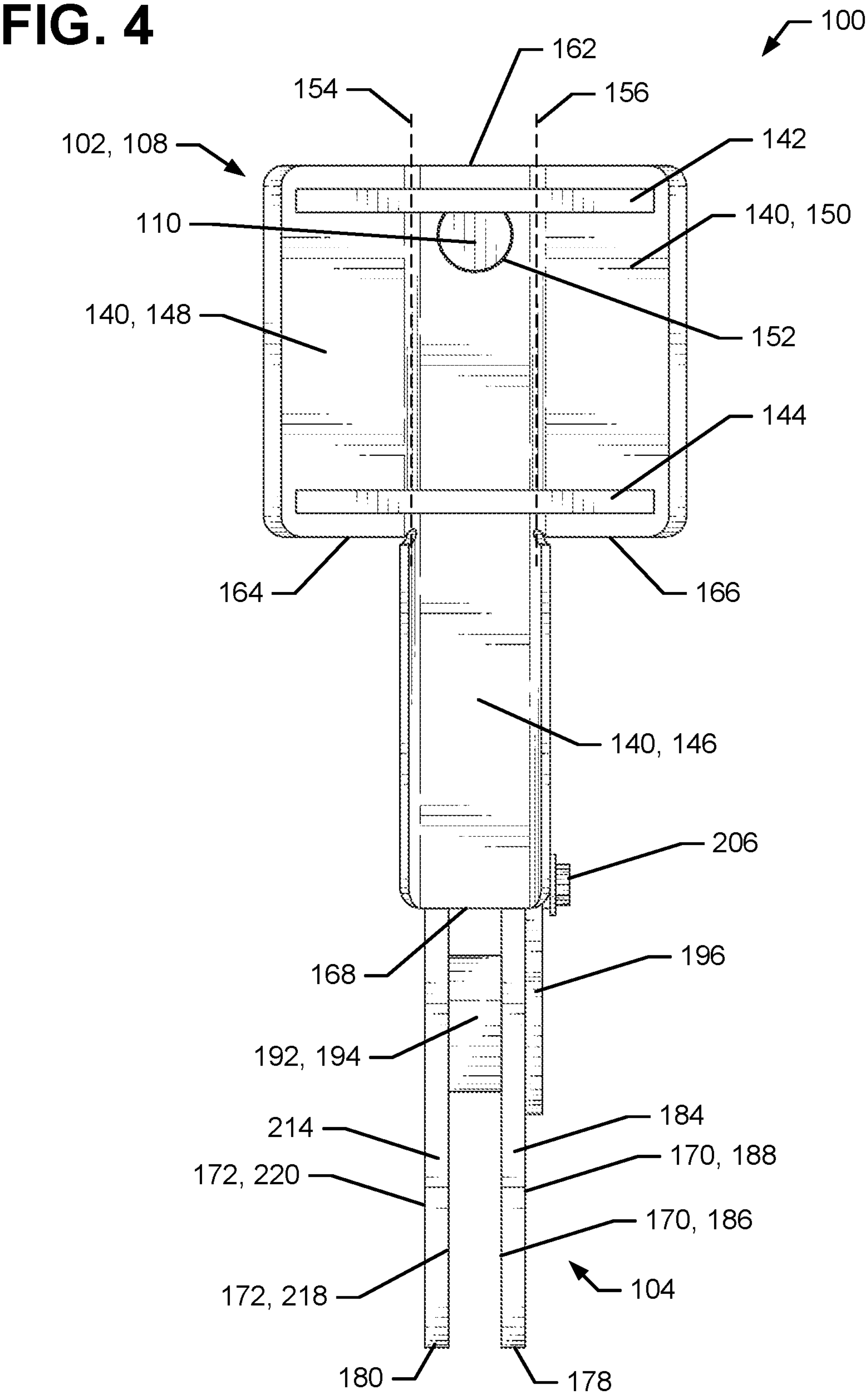
FIG. 4 displays a back elevation view of the trench roller lifting adapter of FIG. 1.

The back portion 108 of lifting adapter's upper portion 102, as also briefly described above, is substantially a mirror image of the front portion 106. As such, the trench roller lifting adapter's back portion 108 includes a guide member 140 and a pair of vertically opposed ribs 142, 144 substantially similar to the guide member 114 and ribs 128, 130 of the front portion 106. Guide member 140 has first, second and third sections 146, 148, 150 with the first section 146 having a generally rectangular shape when viewed in the back elevation view of FIG. 4. The first section 146 extends predominantly in a substantially vertical direction and defines a hole 152 near the top thereof that is adapted to receive a part of pin 110 fixedly secured therein such as by welding of the pin 110 to the guide member's first section 146 around hole 152. It should be understood and appreciated that pin 110 may be secured within hole 152 by other methods that will not permit the pin 110 to move relative to the guide member 140.

The second and third sections 148, 150 of guide member 140 have a generally rectangular shape when viewed normal thereto and extend from the first section 146 in directions away from the first section 146 and gap 112. Similar to the first, second and third sections 116, 118, 120 of guide member 114, the second and third sections 148, 150 of guide member 140 each define respective angles, $\alpha_3$ and $\alpha_4$, relative to the first section 146 (see FIGS. 7 and 8). In accordance with the example embodiment, each of the angles, $\alpha_3$ and $\alpha_4$, has an angular measure of forty-five degrees (45°). However, it should be understood and appreciated that each angle, $\alpha_3$ and $\alpha_4$, may have a different angular measure in other example embodiments and that the second and third sections 148, 150 may form angles, $\alpha_3$ and $\alpha_4$, of different measures relative to the first section 146 in still other example embodiments. Also, in accordance with the example embodiment and similar to guide member 114, the guide member 140 is formed from a substantially planar blank with the profiles of the first, second and third sections 146, 148, 150 being cut from the blank and with the second and third sections 148, 150 being bent relative to the first section 146 along longitudinally and vertically extending bend lines 154, 156 to form angles $\alpha_3$ and $\alpha_4$.

Again similar to the lifting adapter's front portion 106, the pair of vertically opposed ribs 142, 144 of the back portion 108 of the lifting adapter's upper portion 102 are fixedly secured between the first, second and third sections 146, 148, 150 of guide member 140. Ribs 142, 144 restrict flexing and rotation of the guide member's second and third sections 148, 150 about bend lines 154, 156 during use of the lifting adapter 100. Rib 142 is configured in a substantially horizontal plane near the top edge 162 of the guide member 140, while rib 144 is configured in a substantially horizontal plane near respective bottom edges 164, 166 of the guide member's second and third sections 148, 150. Seen in the back elevation view of FIG. 4, rib 144 is located generally at the midpoint between the top and bottom edges 162, 168 of the guide member's first section 146 such that a part of the guide member's first section 146 extends in a generally downward vertical direction from the location at which rib 144 is secured to the first portion 146. Similar to ribs 128, 130, each rib 142, 144 comprises a generally planar member having a trapezoidal shape when viewed in top plan or bottom plan view (see FIGS. 7 and 8) and is secured to and between the guide member's first, second and third sections 146, 148, 150 by welding. It should be understood and appreciated that in other example embodiments, the ribs 142, 144 may have a different shape or be configured differently and may be secured to one or more of the guide member's first, second and third sections 146, 148, 150 by another method that substantially prevents movement of the second and third sections 148, 150 about bend lines 154, 156.

The lower portion 104 of the trench roller lifting adapter 100, as described above, depends from the lifting adapter's upper portion 102 and is connectable to a trench roller so that, in use, the entire lifting adapter 100 extends predominantly in an upward vertical direction from the trench roller with the upper portion 102 being visible and generally accessible from above the trench roller and the lower portion 104 being less visible and generally less accessible from above the trench roller. The lower portion 104 comprises a right leg 170 and an opposed left leg 172 extending downward in a generally vertical direction and partially between and perpendicular to the first sections 116, 146 of guide members 114, 140 of the lifting adapter's upper portion 102. As seen in FIGS. 5 and 6, the right and left legs 170, 172 have respective first ends 174, 176 and distant second ends 178, 180. The right and left legs 170, 172 are positioned with their first ends 174, 176 at a vertical distance, B, from pin 110. The first ends 174, 176 of the right and left legs 170, 172 define the usable lower extent of the gap 112. According to the example embodiment, the distance, B, is selected to make gap 112 sufficiently large in the vertical direction to easily receive a hook or other similar device and to permit such hook or device to move in and out of the gap 112 beneath pin 110 and between the opposed first sections 116, 146 of guide members 114, 140 absent human intervention.

The right leg 170 comprises a substantially planar member extending predominantly in the vertical longitudinal direction between first and second ends 174, 178. The right leg 170 has a front edge 182 and back edge 184, each extending between the leg's first end 174 and second end 178. The first end 174 of right leg 170 is positioned between the first sections 116, 146 of the guide members 114, 140 such that a portion of the leg's front edge 182 is in contact with and fixedly secured to the first section 116 of guide member 114 and a portion of the leg's back edge 184 is in contact with and fixedly secured to the first section 146 of guide member 140. The portions of the leg's front and back edges 182, 184 are, according to the example embodiment and respectively, fixedly secured to guide members 114, 140 by welding. However, it should be understood and appreciated that in other example embodiments, the portions of the leg's front and back edges 182, 184 may be fixedly secured, respectively, to the first sections 116, 146 of guide members 114, 140 by a method that rigidly attaches the right leg 170 to the guide members 114, 140 and that provides sufficient strength for the lifting adapter 100 to used in moving a trench roller into and out of a trench.

As seen in FIG. 6, the lower portion of the right leg's front edge 182 (nearest the leg's second end 178) defines an angle, β, relative to the upper portion of the right leg's front edge 182 (nearest the leg's first end 176) such that the right leg 170 tapers front-to-back and is narrower at the leg's second end 178 than at the leg's first end 176. The measure of angle, β, is selected in conjunction with the dimensions of the right leg 170 so as to provide tapering of the right leg 170 sufficient to enable greater ease of connection and disconnection of the trench roller lifting adapter 100 to/from a trench roller. The angle, β, has a measure of thirty degrees (30°) according to the example embodiment, but it should be understood and appreciated that the angle, β, may have other measures in other example embodiments with angle, β, most likely having a measure in the range of fifteen degrees (15°) to seventy-five degrees (75°).

The right leg 170 has inboard and outboard surfaces 186, 188 (see FIGS. 7 and 8) and defines a bore 190 for receiving a pin 192 therein to releasably couple the trench roller lifting adapter 100 to a trench roller. The bore 190 extends through the right leg 170 and between the inboard and outboard surfaces 186, 188. The pin 192 has a shank 194 and a flange 196 fixedly secured to and about an end of the shank 194. The pin's shank 194 and bore 190 are cooperatively shaped and sized so as to permit the pin's shank 194 to be snugly received within the bore 190, yet be slidable into and out of the bore 190 in a lateral direction generally perpendicular to inboard and outboard surfaces 186, 188 during attachment and detachment of the trench roller lifting adapter 100 to/from a trench roller. The pin's shank 194 is also shaped and sized to withstand shear and other forces acting on the pin's shank 194 during use of the trench roller lifting adapter 100. According to the example embodiment and as viewed in the right side elevation view of FIG. 6, the bore 190 and pin's shank 194 have a stadium or discorectangle cross-sectional shape with their long cross-sectional axes being substantially parallel to the vertical longitudinal direction. It should be understood and appreciated that the bore 190 and pin's shank 194 may have other shapes, sizes and configurations in other example embodiments.

The pin's flange 196 has an inboard surface 198 and opposed outboard surface 200, and defines a bore 202 extending between the inboard and outboard surfaces 198, 200. The bore 202 is cooperatively shaped and sized with the pin's shank 194 and receives an end of the pin's shank 194 therein. The pin's flange 196 and shank 194 are fixedly secured to one another such as by welding or other method suitable for permanently connecting the flange 196 and shank 194. The flange 196 has a lobe portion 204 and defines a hole (not visible) in such lobe portion 204 extending between the pin's inboard and outboard surfaces 198, 200. The hole in the lobe portion 204 aligns coaxially with a hole (not visible) extending between the leg's inboard and outboard surfaces 186, 188. A fastener 206 extends into the holes and releasably secures the pin 192 to the right leg 170 of the lifting adapter's lower portion 104 with the flange's inboard surface 198 in contact with the leg's outboard surface 188 and the pin's shank 194 within the leg's bore 190.

The right leg 170 additionally defines a pair of vertically-disposed holes 208, 210 near the leg's second end 178 extending through the right leg 170 between the leg's inboard and outboard surfaces 186, 188. The holes 208, 210 are configured to receive fasteners extending therethrough when the trench roller lifting adapter 100 is attached to a trench roller to further secure the lifting adapter 100 to the trench roller.

As briefly described above, the lower portion 104 of the trench roller lifting adapter 100 includes a left leg 172 having a first end 176 and a distant second end 180. The left leg 172 is substantially similar to the right leg 170 and comprises a substantially planar member extending predominantly in the vertical longitudinal direction between the leg's ends 176, 180 and generally parallel to the right leg 170. A front edge 212 and back edge 214 extend between the left leg's first and second ends 176, 180. The left leg's first end 176 is positioned between the first sections 116, 146 of the guide members 114, 140 with a portion of the leg's front edge 212 in contact with and fixedly secured to the first section 116 of guide member 114 and a portion of the leg's back edge 214 in contact with and fixedly secured to the first section 146 of guide member 140. In accordance with the example embodiment, the portions of the leg's front and back edges 212, 214 are fixedly secured by welding to guide members 114, 140. It should, however, be understood and appreciated that such portions of the leg's front and back edges 212, 214 may be fixedly secured, respectively, to the first sections 116, 146 of guide members 114, 140 by a method that rigidly attaches the left leg 172 to the guide members 114, 140 and that provides sufficient strength for the lifting adapter 100 to used in moving a trench roller into and out of a trench.

Similar to the right leg 170 and as seen in FIG. 5, the left leg 172 tapers from front-to-back near the leg's second end 180 and is narrower at the leg's second end 180 than at the leg's first end 176. So that the left leg 172 is generally a mirror image of the right leg 170, the lower portion of the left leg's front edge 212 (nearest the leg's second end 180) defines an angle, Θ, relative to the upper portion of the left leg's front edge 212 (nearest the leg's first end 176) that has a measure equal to the angle, β, described above with respect to the right leg 170. The tapering of the left leg 172, like the tapering of the right leg 170, enables greater ease of connection and disconnection of the trench roller lifting adapter 100 to/from a trench roller.

Figure 7:
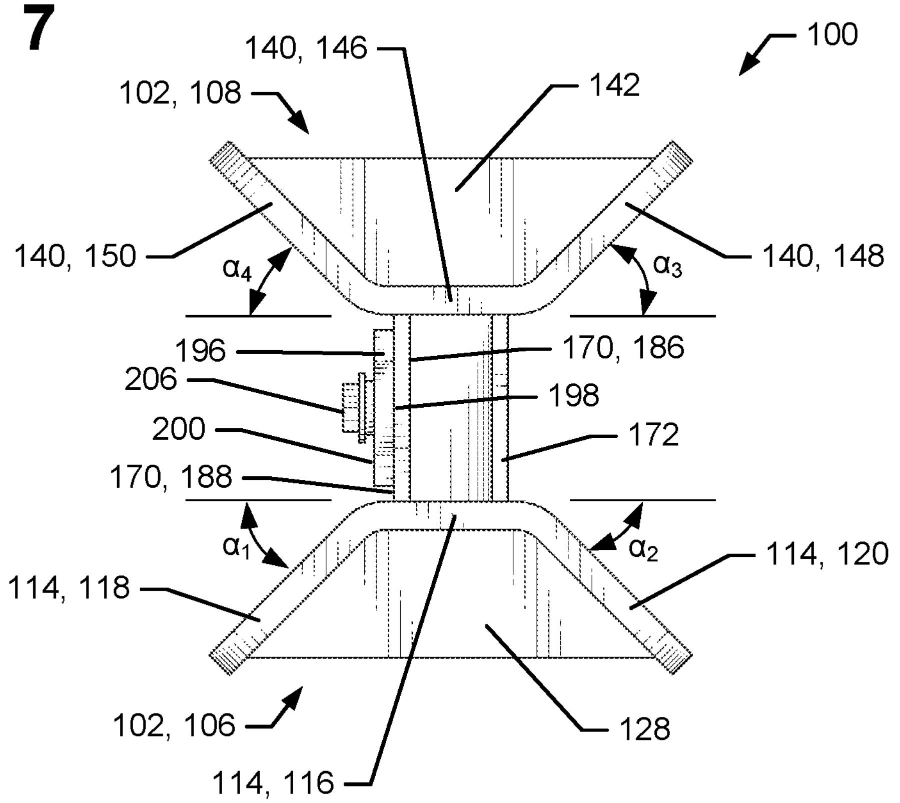
FIG. 7 displays a top plan view of the trench roller lifting adapter of FIG. 1.
Figure 8:
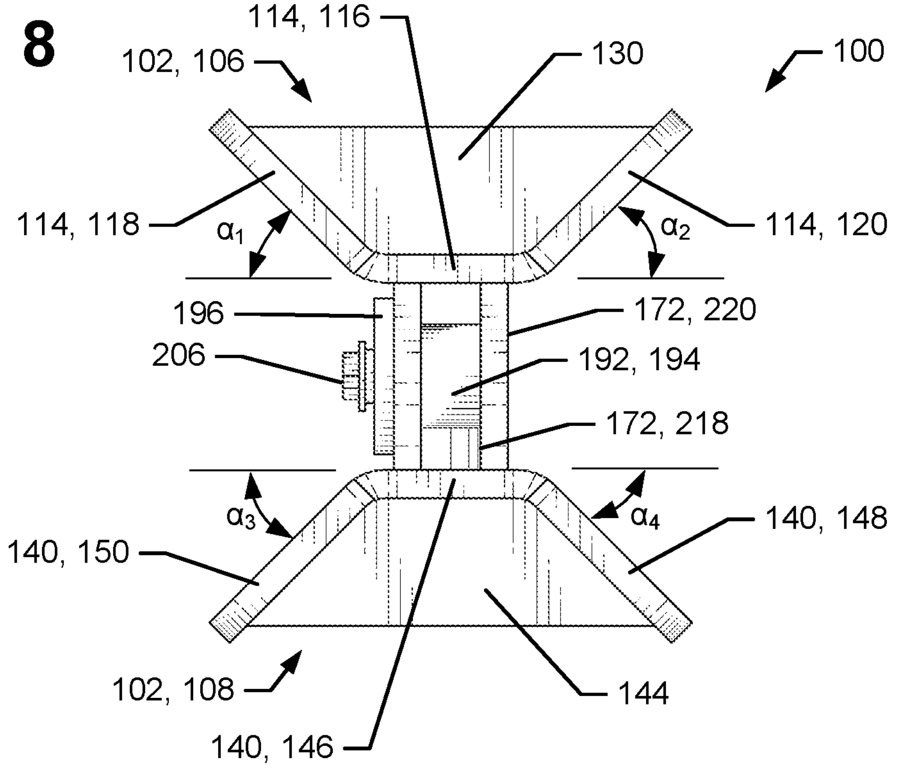
FIG. 8 displays a bottom plan view of the trench roller lifting adapter of FIG. 1.

The left leg 172 defines a bore 216 extending therethrough between inboard and outboard surfaces 218, 220 (see FIGS. 7 and 8). The bore 216 is coaxially aligned with bore 190 of the first leg 170 and is configured to match the size and shape of bore 190 such that bore 216 is adapted to snugly receive the shank 194 of pin 192 therein and to allow the shank 194 to slide into and out of the bore 216 in a lateral direction generally perpendicular to inboard and outboard surfaces 218, 220 during attachment and detachment of the trench roller lifting adapter 100 to/from a trench roller. The left leg 172 also defines a hole 222 extending between the leg's inboard and outboard surfaces 218, 220 for receiving a fastener in the event the pin's shank 194 is alternatively inserted through bores 190, 216 with the pin's flange 196 in contact with the outboard surface 220 of the left leg 172.

Additionally and similar to the right leg 170, the left leg 172 defines a pair of vertically-disposed holes 224, 226 near the leg's second end 180 extending through the left leg 172 between the leg's inboard and outboard surfaces 212, 214. The holes 224, 226 are coaxially aligned with holes 208, 210 of the right leg 170 and are configured to receive fasteners extending therethrough when the trench roller lifting adapter 100 is attached to a trench roller to further secure the lifting adapter 100 to the trench roller.

Together, the right and left legs 170, 172 of the lifting adapter's lower portion 104 form a fork-like or clevis-like structure for receiving a tang-like portion of a trench roller therebetween. The tang-like portion defines a bore configured similarly to bores 190, 216 such that when the tang-like portion is present between the lifting adapter's right and left legs 170, 172 during use, the shank 194 of pin 192 extends through the bore in the tang-like portion and through the bores 190, 216 of the legs 170, 172. Acting similarly to a clevis pin and in conjunction with fasteners secured through holes 208, 210 of the right leg 170 and holes 224, 226 of the left leg 172, the pin 192 couples the tang-like portion of the trench roller (and, hence, the trench roller) to the trench roller lifting adapter 100. Once so coupled, the trench roller may be lifted into or out of a trench through use of the trench roller lifting adapter 100 and without requiring a human to enter the trench to connect the trench roller for lifting and movement.

During use, the trench roller lifting adapter 100 is secured to a trench roller by positioning the lifting adapter 100 relative to the trench roller with a cooperative tang-like portion of the trench roller received between the right and left legs 170, 172 of the lifting adapter's lower portion 104. Then, the shank 194 of pin 192 is inserted into and received through bore 190 of leg 170, through the bore in the tang-like portion, and through the bore 216 of leg 172. Fasteners are next inserted into and received through holes 208, 210 of the right leg 170 and holes 224, 226 of the left leg 172. With pin 192 securely held in position, the tang-like portion of the trench roller (and, hence, the trench roller) is releasably coupled to the trench roller lifting adapter 100.

To lift the trench roller, whether into or out of a trench, a hook dangling from an excavator, tractor or other type of construction equipment is positioned near the upper portion 102 of the trench roller lifting adapter 100. The hook is moved toward pin 110 at an elevation slightly below the elevation of the pin 110 by the equipment operator. Typically, the hook moves around in a somewhat uncontrollable manner while being moved in a direction predominantly toward pin 110 and may strike the second sections 118, 148 of guide members 114, 140 or the third sections of 120, 150 of guide members 114, 140. Because the second sections 118, 148 of guide members 114, 140 and the third sections of 120, 150 of guide members 114, 140 are angled relative to the first sections 116, 146 of guide members 114, 140, the hook is directed and guided by the guide members 114, 140 into gap 112 as the hook moves toward pin 110. Upon further movement of the hook toward pin 110, the hook contacts pin 110 and through a slight movement of the hook in the upward vertical direction, the hook engages pin 110. In response to further movement in the upward vertical direction, the hook exerts a force on pin 110 causing pin 110 and, hence, the lifting adapter 100 and trench roller to be moved in the upward vertical direction. With the lifting adapter 100 and trench roller suspended from the hook, the lifting adapter 100 and trench roller may be moved into or out of a trench, as the case may be.

After movement of the trench roller into or out of the trench and to render the trench roller ready for subsequent use or movement, the hook is disengaged from the trench roller. To do so, the hook is moved by the equipment operator in a generally downward vertical direction to disengage the hook from pin 110. Further movement of the hook by the equipment operator in a direction generally away from pin 110 moves the hook out of gap 112 and away from the trench roller lifting adapter 100. The trench roller is then ready for use or additional movement, such as away from the trench to another area of the construction site or onto a flatbed truck or trailer for movement elsewhere.

Whereas the present invention has been described in detail above with respect to an example embodiment thereof, it should be appreciated that variations and modifications might be effected within the spirit and scope of the present invention.

What is claimed is:

1. An apparatus for use in lifting a trench roller into or out of a trench, said apparatus comprising:
- a clevis configured to receive a tang protruding from the trench roller for secure connection to the trench roller;
- a first pin extending between two sides of the clevis, where a central portion of the first pin is exposed for connection to the trench roller;
- a first guide member and an opposed second guide member defining a gap therebetween, the first guide member and the second guide member being configured to direct an implement for lifting the trench roller into the gap;
- a second pin extending within the gap between the first guide member and the second guide member; and
- a body coupled to the clevis and to the first guide member and second guide member.

2. The apparatus of claim 1, wherein the second pin is adapted to be received at least partially by a hook of the implement.

3. The apparatus of claim 2, wherein the first guide member and second guide member are further configured to direct at least part of the hook under the second pin.

4. The apparatus of claim 1, further comprising a first leg and a second leg extending from the body to form the clevis, the first leg and the second leg providing a taper.

5. An apparatus for use in lifting a trench roller into or out of a trench, the apparatus comprising:
- first and second legs and a first pin that extends between the first and second legs, the first pin including a shank, the first pin having a central portion that is exposed for connection with the trench roller;
- a flange affixed to an outside surface of the first leg and secured to an end of the shank;
- a first guide member and an opposed second guide member defining a gap therebetween, the first guide member and the second guide member being configured to direct an implement for lifting the trench roller into the gap;
- a second pin extending within the gap between the first guide member and the second guide member; and
- a body coupled to the first leg and the second leg and to the first guide member and the second guide member.

6. The apparatus of claim 5, wherein the first and second guide members comprise multiple sections for guiding the implement.

7. The apparatus of claim 6, wherein the multiple guide sections include sections that diverge from each other.

8. The apparatus of claim 5, wherein the first leg and the second leg extend from the body to form a clevis configured to receive a tang protruding from the trench roller for secure connection of the first pin to the trench roller.

9. A method of lifting a trench roller into or out of a trench, the method comprising:
- providing a clevis configured to receive a tang protruding from the trench roller for secure connection to the trench roller;
- providing a first pin extending between two sides of the clevis, where a central portion of the first pin is exposed for connection to the trench roller;
- providing a first guide member and an opposed second guide member defining a gap therebetween, the first guide member and the second guide member being configured to direct an implement for lifting the trench roller into the gap;
- providing a second pin extending within the gap between the first guide member and the second guide member;
- providing a body coupled to the clevis and to the first guide member and second guide member;
- positioning the clevis to receive the tang protruding from the trench roller to couple the trench roller to the first pin; and
- directing the implement into the gap between the first guide member and second guide member to couple the implement to the second pin.

10. The method of claim 9, wherein providing the second pin comprises providing the second pin so that the second pin is adapted to be received at least partially by a hook of the implement.

11. The method of claim 10, wherein providing the first guide member and providing the second pin comprise providing the first guide member and providing the second guide member so that the first guide member and the second guide member are further configured to direct at least part of the hook under the second pin.

12. The method of claim 9, further comprising providing a first leg and a second leg extending from the body to form the clevis, the first leg and the second leg providing a taper.

* * * * *